UNITED STATES PATENT OFFICE.

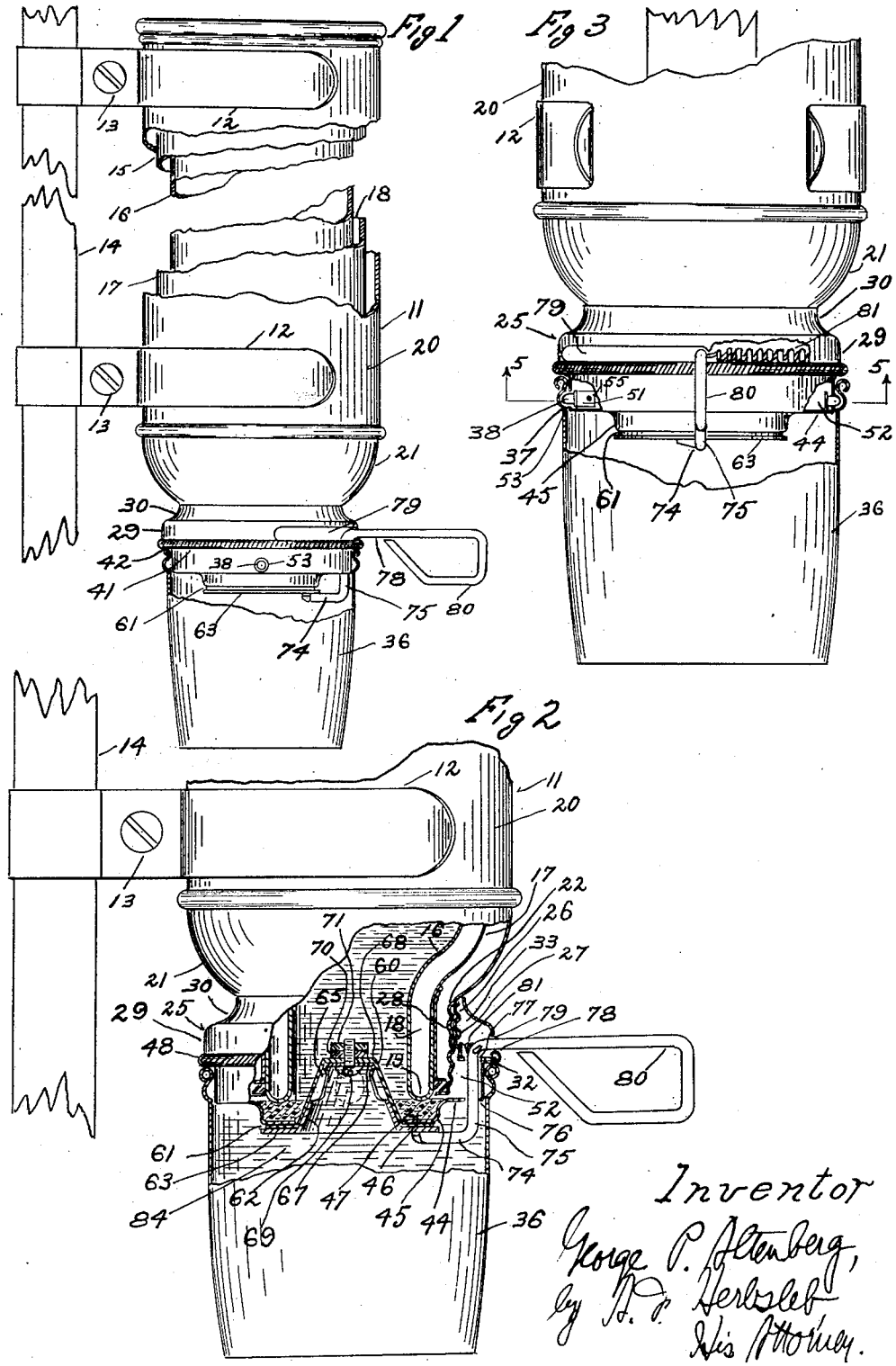

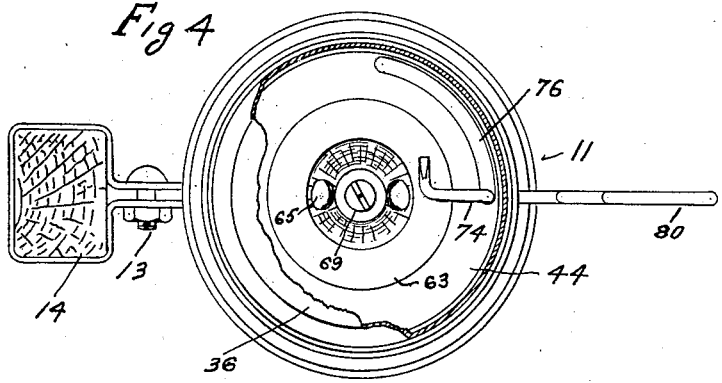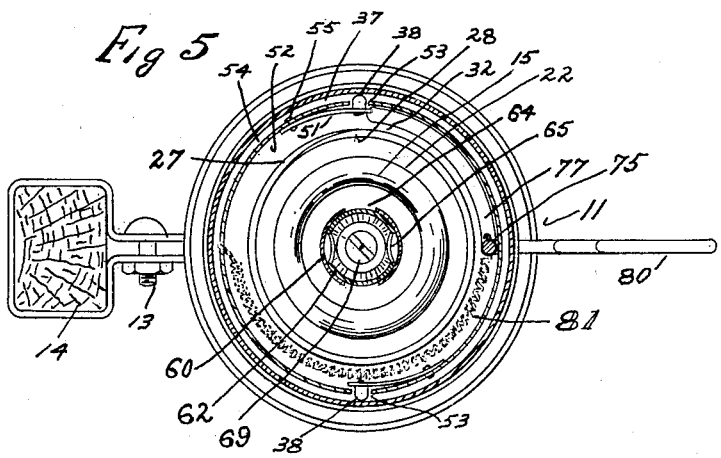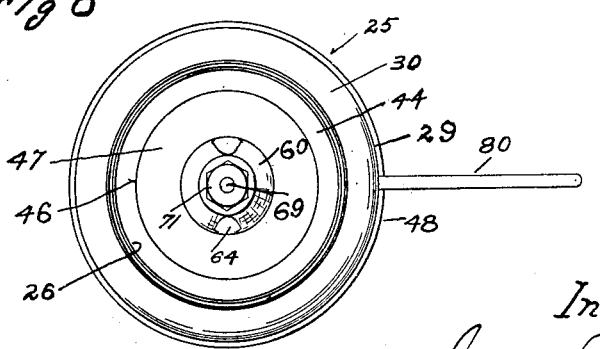

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

DISPENSING APPARATUS.

1,412,330.      Specification of Letters Patent.     Patented Apr. 11, 1922.

Application filed June 21, 1918. Serial No. 241,162.

*To all whom it may concern:*

Be it known that I, GEORGE P. ALTENBERG, a citizen of the United States, residing at Cincinnati, in the county of Hamilton and State of Ohio, have invented certain new and useful Improvements in Dispensing Apparatus, of which the following is a specification.

My invention is especially useful for employment on aeroplanes or other vehicles on which the number of parts to be manually operated by the driver or operator are quite numerous and the hands of the operator have quite a number of duties to perform, so that it is extremely undesirable, in fact dangerous, for the operator to release both hands simultaneously from the operating parts of the vehicle. My invention is also employable in other relations, in which it is desired to employ only one hand in drawing contents from the vessel and serving or consuming the same.

It is the object of my invention to provide a vessel having novel discharging means and in which the temperature of a liquid refreshment or stimulant, for instance hot tea or coffee, may be maintained for a long time, for instance an entire day, and so arranged as to be secured as to an aeroplane in inverted position, so that the mouth of the vessel is presented downwardly; further, to provide a closure which has attachment to the vessel and comprises discharging means which extend into the body of liquid within the vessel; further, to provide closing means provided with exit ports and closing parts for said exit ports, said exit ports and said closing parts extending into the vessel and arranged to be wholly surrounded by the liquid in the vessel; further, to provide novel dispensing means for a vessel; and, further, to provide a cup and releasable securing means for the same for normally holding the cup under the mouth of the vessel with the upper end of the cup extending above the lower end of said mouth and a closure means for the mouth having an operating part extending outside the cup rotatable for opening and closing the closure means.

The invention will be further readily understood from the following description and claims, and from the drawings, in which latter:

Fig. 1 is a front elevation of an exemplification of my invention, showing a vacuum heat-insulated bottle, partly broken away, secured in inverted position to an aeroplane, the latter partly broken away, and the vacuum heat-insulated bottle having its cup applied thereto, the latter partly broken away for exposure of the interior.

Fig. 2 is a similar view, showing the mouth-end of the bottle in axial section.

Fig. 3 is a side elevation of my improved device, partly in axial section.

Fig. 4 is an end view of my improved device with the cup partly broken away to expose the closure of the vessel.

Fig. 5 is a cross-section of my improved device taken in the plane of the line 5—5 of Fig. 3; and, Fig. 6 is a plan view of the closure-cap removed from the bottle.

My present invention is an elaboration of the improvement upon the closure means for vessels shown, described and claimed in my copending application, Serial No. 220,280, filed March 4, 1918, for improvements in dispensing apparatus, in which I broadly claim the devices of which the disclosure herein is a species.

The heat-insulated vessel 11 is held in inverted position, as by being received between spring clips 12, secured by screw and nut connection 13 about a stanchion 14 of an aeroplane, convenient to the seat of the operator, so that the operator may readily reach and fill the cup of the vessel while manipulating his machine.

The heat-insulated vessel is exemplified as a vacuum-insulated bottle having an inner vessel 15, and comprising an inner wall 16 and an outer wall 17 arranged concentrically throughout, and having a vacuum-insulated space 18 between them, the inner and outer walls being connected at their mouths by a cross-seal 19.

The outside of the vessel comprises a casing 20. The casing is preferably of sheet-metal. The casing is shown comprising a breast 21 and a neck 22.

A closure-cap 25 is provided. This closure-cap is exemplified as releasably connected with the casing by coacting securing means, so that the cap may be used interchangeably in connection with a plurality of bottles. These coacting securing means are shown as threaded connections, although other connections for the purpose may be employed. Thus a ring 26 of the closure-cap is provided with screw-threads 27, which coact with screw-threads 28 on the neck 22.

The cap is preferably provided with a median annularly outwardly bulged portion 29, from which a canopy 30 extends slantingly toward the axis of the bottle at one end of the annular bulged portion. The screw-ring has an annular laterally extending flange 32, the outer edge of which is supported by the cap. There is an annular space 33 between the screw-ring and the canopy at one side of the flange 32.

A cup is exemplified at 36, and is arranged to be releasably secured to the vessel by a simple movement of the hand of the operator. This movement is preferably a substantially axial movement of the cup, regardless of the position of the cup in the hand, the complemental fastening means being exemplified as an annular groove 37 in the cup near its mouth and pins 38 in the cap.

The cap is provided with an annular rabbet 41 for receiving the mouth-end of the cup, the pins urging the mouth of the cup against the annular inner end-wall 42 of said rabbet.

The cap is provided with a laterally inwardly extending flange 44, provided with a downwardly bulged annular bead 45, forming an annular recess 46 in which a ring 47 is located. This ring is a cushion-member, which may consist of compressible material, such as cork or rubber and is instanced as cork. The closure-cap is threaded over the threaded neck of the vessel, the cushion-member 47 being compressed against the mouth of the inner vessel for forming a connection therewith to prevent leakage of fluid past said mouth into the cap.

Suitable means are provided for holding and supporting the inner vessel in the casing to permit compression of the cushion-member between the inner vessel and the cap when the cap is secured in place. The outwardly bulged portion of the cap is exemplified as provided with a knurled section 48 for aiding in grasping thereof by the hand for turning the same.

The pins 38 are exemplified as on flat springs 51, located in the annular recess 52 between the flanges 32, 44, the pins projecting through openings 53 in the lateral wall 54 of the cap, the other ends of the springs being fastened to said cap, as by rivets 55.

The closing means for the mouth are exemplified as extending into the interior of the inner vessel past the cushion-member 47. For this purpose the closure-cap is provided with a valve-seat 60, exemplified as extending inwardly from the bead 45 on the flange 44 and as of frusto-conical form. It is shown provided with a laterally outwardly extending flange 61 which is secured to the bead 45 and forms one wall of the recess 46.

A valve 62 coacts with the valve-seat and is exemplified as of frusto-conical form and having a flange 63 extending radially outward to cover the annular bead 45. The valve-seat is provided with ports 64 and the valve is provided with ports 65, these ports extending into the inner vessel and shown as located above the annular cushion-member 47. The valve and valve-seat are respectively provided with end walls 67, 68, through which a screw 69 passes, nuts 70, 71, being received over the threaded end of the screw, with the end-walls 67, 68, located between said nuts and the head of the screw, the construction permitting adjustment of the valve and ease of movement thereof.

An arm 74 projects from the valve to a point outside the cup for manipulating the valve while the cup is in receiving position under the mouth. The arm is exemplified as secured to the flange 63, as by soldering or brazing. It extends laterally from the flange, and has a section 75 which extends substantially parallel with the axis of the bottle through a slot 76 in the flange 44, and a slot 77 in the flange 32, these slots being arcuate slots. A laterally extending section 78 of the arm extends outwardly through a slot 79 in the bulged portion 29 of the closure-cap. The laterally extending section may be provided with a handle 80, shown as formed by bending the wire of which the arm is composed. When the arm is moved to one limit of the slots, the valve is closed, and when the arm is moved to the other limit of the slots, the valve is open to full extent for discharge of the contents into the cup. Intermediate positions of the arm regulate the extent of opening of the ports of the valve. In order to normally cause closure of the valve, a spring 81 is provided and is exemplified as located in the annular recess 33, one end of the spring being secured to the wall of said recess, and the other end of said spring being secured to the arm, the spring being exemplified as a helical spring.

If the operator desires to partake of contents of the bottle, he imparts a lateral movement to the arm using only one hand for the purpose as the cup is in normal position suspended from the mouth-end of the bottle. The operator thereby draws contents from the bottle into the cup. When a sufficient amount of contents has been received by the cup, the arm is released, the valve thereby closing. Overflow of the cup is prevented for the reason that the mouth-end of the cup extends above the outer end of the mouth of the cap. When the liquid 84 in the cup has reached the mouth of the cap, no further air will be admitted into the vessel and the flow therefrom will cease. (See Fig. 2.) The cup may then be removed from the bottle by the same hand of the operator which has moved the arm, this removal being accomplished by a simple axial pull of the cup away from the bottle, or other simple movement, whereby the pins 38 are caused to recede from the groove 37 in the mouth-end of the cup for releasing the cup. The cup is arranged to be replaced by a simple opposite movement of the hand or pressure of the cup toward the bottle in the present exemplification.

The construction is such as to minimize action of temperature outside the cup on the contents of the vessel, the cup further protecting the valve. The inner end of the valve projects into the liquid which is in the vessel, and is surrounded thereby, whereby freezing of the valve is prevented.

Having thus fully described my invention, what I claim as new and desire to secure by Letters Patent, is:

1. In combination, a heat-insulated vessel comprising a mouth, a cup for said mouth, means for detachably securing said cup about said mouth, a closure for said mouth covered by said cup when so positioned, said closure comprising a rotatable part, means normally closing said mouth while said cup is so positioned and means extending outside said cup for rotating said rotatable part.

2. In combination, a heat-insulated vessel comprising a neck and a dispensing mouth arranged for presenting said mouth downwardly, a closure for said mouth comprising a closure-cap, a dispensing cup, cushioning means between said cap and mouth, means for securing said cap to said mouth and thereby compressing said cushioning means, said closure comprising a valve extending into the neck of the vessel beyond said cushioning means, said dispensing mouth opening into said dispensing cup, and releasable attaching means between said cap and said dispensing cup.

3. The combination of a heat-insulated vessel, means for securing said heat-insulated vessel in inverted position, a closure-cap for the mouth of said vessel, releasable securing means between said vessel and said closure-cap, said closure-cap having a mouth, a cup, means for releasably securing said cup about said last-named mouth, a closure for said last-named mouth, and a laterally movable arm extending outside said cup and having connection with said closure for operating the same.

4. In combination, a vessel arranged for being secured in inverted position and having a mouth projected downwardly, a cup, means for detachably securing said cup about said mouth, a closure for said mouth covered by said cup when so positioned, said closure comprising a rotatable part, means normally closing said mouth while said cup is so positioned and means extending outside said vessel and cup for rotating said rotatable part.

5. In combination, a vessel comprising a mouth arranged to be placed in inverted position for presenting said mouth downwardly, a closure-cap, complemental releasable securing means between said closure-cap and said vessel, a cup, complemental releasable securing means between said cup and said closure-cap for holding said cup under said mouth with the rim of said cup higher than the lower end of said mouth, a closure for said mouth in said cup when said cup is so held, said closure comprising a rotatable part, and an arm having connection with said rotatable part and extending above said cup when said cup is so held.

6. In combination, a vessel comprising a mouth arranged to be placed in inverted position for presenting said mouth downwardly, a closure-cap, complemental releasable securing means between said closure-cap and said vessel, a cup, complemental releasable securing means between said cup and said closure-cap for holding said cup under said mouth with the rim of said cup higher than the lower end of said mouth, a closure for said mouth in said cup when said cup is so held, said closure comprising a rotatable part, and an arm having connection with said rotatable part, said arm having an upwardly extending section in said cup, and an outwardly extending section above said cup for operating said movable part when said cup is so held.

7. In combination, a vessel comprising a mouth arranged to be placed in inverted position for presenting said mouth downwardly, a closure-cap, complemental releasable securing means between said closure-cap and said vessel, a cup, complemental releasable securing means between said cup and said closure-cap for holding said cup under said mouth with the rim of said cup higher than the lower end of said mouth, a closure for said mouth in said cup when said cup is so held, said closure comprising a rotatable part, an arm having connection with said rotatable part, said arm having an upwardly extending section in said cup, an outwardly extending section above said cup for operating said movable part when said cup is so held, and spring means for normally closing said movable part.

8. In combination, closing means for a vessel having its mouth projected downwardly comprising a closure-cap having means thereon for attaching the same to a vessel, an annular compressible member arranged to coact with the mouth of said vessel, a valve surrounded by said compressible member and extending above the same, said closure-cap comprising cup-receiving means, and an arm for operating the movable part of said valve, said arm having connection with said movable part and provided with a section within said cup-receiving means and a section extending outside said cup-receiving means.

9. In combination, closing means for the mouth of a vessel having its mouth projected downwardly, said closing means comprising a closure-cap having a cup-receiving rabbet, an inwardly extending flange, an annular compression-member for the mouth of the vessel on said flange, a closure, said compression-member located about said closure, a screw-ring spaced in axial direction from said flange, a canopy outside said screw-ring, and means for operating said closure extending through said flange within said cup-receiving rabbet and having an outwardly extending section between said rabbet and the upper end of said canopy.

10. In combination, a closing means for a downwardly projecting mouth comprising a closure-cap arranged for receiving a cup thereabout, said closure-cap having an inwardly extending flange provided with a median upwardly extending frusto-conical portion forming a valve-seat having a discharge opening therein, and an annular groove surrounding said last-named part, an annular sealing member for said mouth in said groove, a frusto-conical valve provided with a port in said frusto-conical part, and an arm having connection with said valve and extending laterally outward.

11. In combination, a heat-insulated vessel comprising a dispensing mouth arranged for presenting said mouth downwardly, a closure for said mouth comprising a closure-cap, cushioning means between said cap and mouth, a dispensing cup and means for securing said cap to said mouth and thereby compressing said cushioning means, said closure comprising a valve extending into the mouth of the vessel beyond said cushioning means, said dispensing mouth opening into said dispensing cup, means for releasably securing said cup to said closure-cap, and means for operating said valve extending outside said cup and cap.

In testimony whereof, I have hereunto signed my name in the presence of two subscribing witnesses.

GEORGE P. ALTENBERG.

Witnesses:
J. G. DE FOSSET,
THERESA M. SILBER.